United States Patent [19]

Hashimoto

[11] Patent Number: 4,817,128

[45] Date of Patent: * Mar. 28, 1989

[54] EASILY OPERABLE AUTOMATIC TELEPHONE ANSWERING/RECORDING APPARATUS AND METHOD OF OPERATING THE SAME

[75] Inventor: Kazuo Hashimoto, Tokyo, Japan

[73] Assignee: Hashimoto Corporation, Tokyo, Japan

[*] Notice: The portion of the term of this patent subsequent to Mar. 14, 2006 has been disclaimed.

[21] Appl. No.: 38,459

[22] Filed: Apr. 8, 1987

Related U.S. Application Data

[63] Continuation of Ser. No. 648,743, Sep. 10, 1984, abandoned.

[30] Foreign Application Priority Data

Apr. 28, 1984 [JP] Japan .................................. 59-86994

[51] Int. Cl.⁴ .............................................. H04M 1/65
[52] U.S. Cl. ....................................... 379/70; 360/137
[58] Field of Search ....................... 379/68, 70, 75, 77, 379/80; 360/74.4, 137; 369/25

[56] References Cited

U.S. PATENT DOCUMENTS

| | | | |
|---|---|---|---|
| 3,381,276 | 4/1968 | James | 179/6.11 |
| 3,729,201 | 4/1973 | Dollenmayer | 369/25 |
| 3,872,254 | 3/1975 | Murata et al. | 179/6.11 |
| 4,004,276 | 1/1977 | Robinson et al. | 179/6.11 |
| 4,471,398 | 9/1984 | Kommoss et al. | 360/137 |
| 4,488,274 | 12/1984 | Plunkett, Jr. | 179/6.01 |
| 4,518,827 | 5/1985 | Sagara | 179/6.14 |

FOREIGN PATENT DOCUMENTS

| | | | |
|---|---|---|---|
| 3003732 | 8/1981 | Fed. Rep. of Germany | 379/79 |
| 52-53408 | 4/1977 | Japan | 360/137 |
| 54-104307 | 8/1979 | Japan | 360/137 |
| 55-70949 | 5/1980 | Japan | 360/137 |

Primary Examiner—Raymond F. Cardillo
Assistant Examiner—James E. Tomassini
Attorney, Agent, or Firm—Lowe, Price, LeBlanc, Becker & Shur

[57] ABSTRACT

An automatic telephone answering/recording apparatus and a method of operating the same are provided. The apparatus has three operation buttons consisting of an outgoing message tape operation button, an automatic telephone answering/recording apparatus operation button, and an incoming message tape operation button. When the apparatus operation buton is depressed, the automatic telephone answering/recording apparatus is set in the answering/recording standby mode. An outgoing message tape can be set in the play, stop, rewind, or fast forward mode in accordance with the number of times of depressions of the outgoing message tape operation button. Similarly, an incoming message tape can be set in the play, stop, rewind, or fast forward mode in accordance with the number of times of depressions of the incoming message tape operation button. The apparatus button and the outgoing message tape button or the apparatus button and the incoming message tape button are simultaneously or sequentially depressed to set the apparatus in the record or erase mode.

3 Claims, 7 Drawing Sheets

EASILY OPERABLE AUTOMATIC TELEPHONE ANSWERING/RECORDING APPARATUS AND METHOD OF OPERATING THE SAME

This application is a continuation of application Ser. No. 648,743, filed Sept. 10, 1984, now abandoned.

CROSS REFERENCE TO RELATED APPLICATIONS

This application is related to applications Ser. Nos. 853,409, filed Apr. 18, 1986, and 857,766, filed Apr. 29, 1986, assigned to the assignee of this invention.

BACKGROUND OF THE INVENTION

The present invention relates to an easily operable automatic telephone answering/recording apparatus and a method of operating the same, the apparatus being capable of automatically responding to an incoming call and recording a message of a calling party.

Figure 1A:
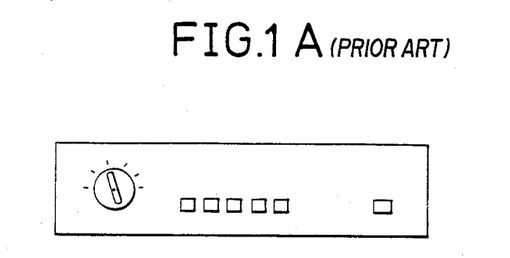
FIGS. 1A and 1B are schematic views showing switch operation panels of typical conventional automatic telephone answering/recording apparatuses, respectively.
Figure 1B:
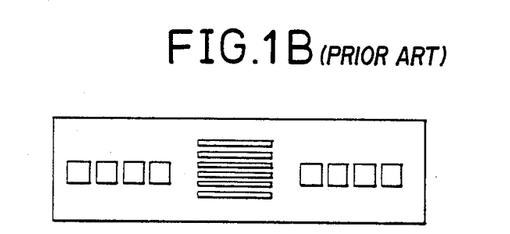

Conventional automatic telephone answering/recording apparatuses have both outgoing and incoming message tapes. According to a typical conventional automatic telephone answering/recording apparatus, an outgoing message from the outgoing message tape is sent to a caller when an incoming call is received from the caller, and thereafter an incoming message is recorded on the incoming message tape. In this manner, the outgoing and incoming message tapes are alternately used, resulting in complex button operation. When a user uses this automatic telephone answering/recording apparatus, he may feel difficulty which prevents the widespread application of the apparatus. Typical conventional automatic telephone answering/recording apparatuses have switch operation panels shown in FIGS. 1A and 1B, respectively. In each of the switch operation panels, four or more buttons are arranged, including a REC or recording button for recording an outgoing message on the outgoing message tape, a PLAY button for playing the outgoing message tape, a REW or rewind button for rewinding the outgoing message tape, and an FF button for fast-forwarding the outgoing message. Furthermore, at least two other operation buttons (RECORD and PLAY) are required when an endless tape look is used as the outgoing message tape. An open-reel type cassette tape is sometimes generally used as the outgoing message tape in place of an endless tape. In order to operate this tape, at least four or five buttons are required including a REC or PLAY button, a STOP button, a REW button and an FF button. In addition, at least one or two rotary switches or pushbuttons are required to set the apparatus in an automatic position (i.e., automatic answering/recording mode). When the general user operates these buttons, he must feel difficulty which prevents popular use by most people or housewives.

SUMMARY OF THE INVENTION

It is a first object of the present invention to decrease the number of buttons of a conventional automatic telephone answering apparatus to three.

It is a second object of the present invention to decrease the number of operation buttons to three in an automatic telephone answering/recording apparatus having speech synthesizing means (e.g., ADPCM) for synthesizing an outgoing message instead of an outgoing or incoming message tape.

It is a third object of the present invention to provide a method of operating an easily operable automatic telephone answering/recording apparatus.

In order to achieve the above objects of the present invention, there is provided an easily operable automatic telephone answering/recording apparatus and a method of operating the same, the apparatus being arranged to engage a loop forming circuit upon reception of an incoming call, reproduce an outgoing message from outgoing message storage means and sending the outgoing message onto a telephone line, and record an incoming message of a calling party in incoming message storage means, wherein said outgoing and incoming message storage means comprise magnetic tapes each of which has two ends, endless magnetic tapes, or speech synthesizing means, respectively; the automatic telephone answering/recording apparatus has three operation buttons for selecting an operating mode thereof and detecting means for detecting a single depression of each of the operation buttons and the number of times of succeeding depressions of the operation buttons so as to discriminate the number of times of depressions of each of the operation buttons or two buttons which are simultaneously depressed; and three buttons are operated to perform all necessary record, play and fast forward operations in such a manner that a waiting setting means is operated in response to a discrimination signal from the detecting means to set the automatic telephone answering/recording apparatus in a recording mode for recording an incoming message from the calling party in the incoming message storage means after the automatic telephone answering/recording apparatus is engaged with the telephone line to form a loop circuit upon reception of the incoming call so as to send out the outgoing message, or that the switching means is operated in response to another discrimination signal from the detecting means to cause the automatic telephone answering/recording apparatus to perform all necessary record, play and fast forward operations so as to record, play or fast forward the incoming and outgoing message storage means.

The present invention can, therefore, provide a method of properly ergonomically operating the automatic telephone answering/recording apparatus instead of a complicated operation mechanism of the conventional automatic telephone answering/recording apparatus. The automatic telephone answering/recording apparatus according to the present invention can be operated irrespective of the type of outgoing and incoming message storage means. For example, these means may comprise magnetic tapes each having two ends or endless tapes. The outgoing message tape may be independent of the incoming message tape. Alternatively, a single multilayer cassette tape may be used to record both the outgoing and incoming messages. In addition, the outgoing and incoming message storage means are not limited to the magnetic tapes, but may be a speech synthesis means such as an ADPCM. The automatic telephone answering/recording apparatus has a variety of future applications. However, the operation is simplified and standardized, thus resulting in great practical advantages.

DETAILED DESCRIPTION OF THE PREFERRED EMBODIMENT

An automatic telephone answering/recording apparatus according to an embodiment of the present invention will be described with reference FIG. 2.

Figure 2:
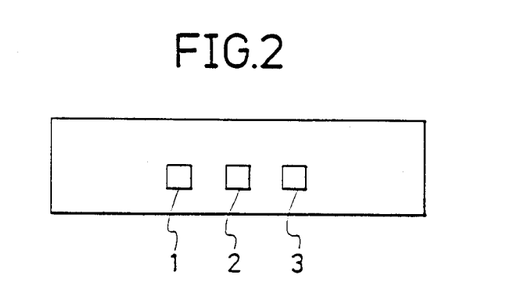
FIG. 2 is a schematic view showing a switch operation panel of an automatic telephone answering/recording apparatus according to an embodiment of the present invention.
Figures 3, 3A:
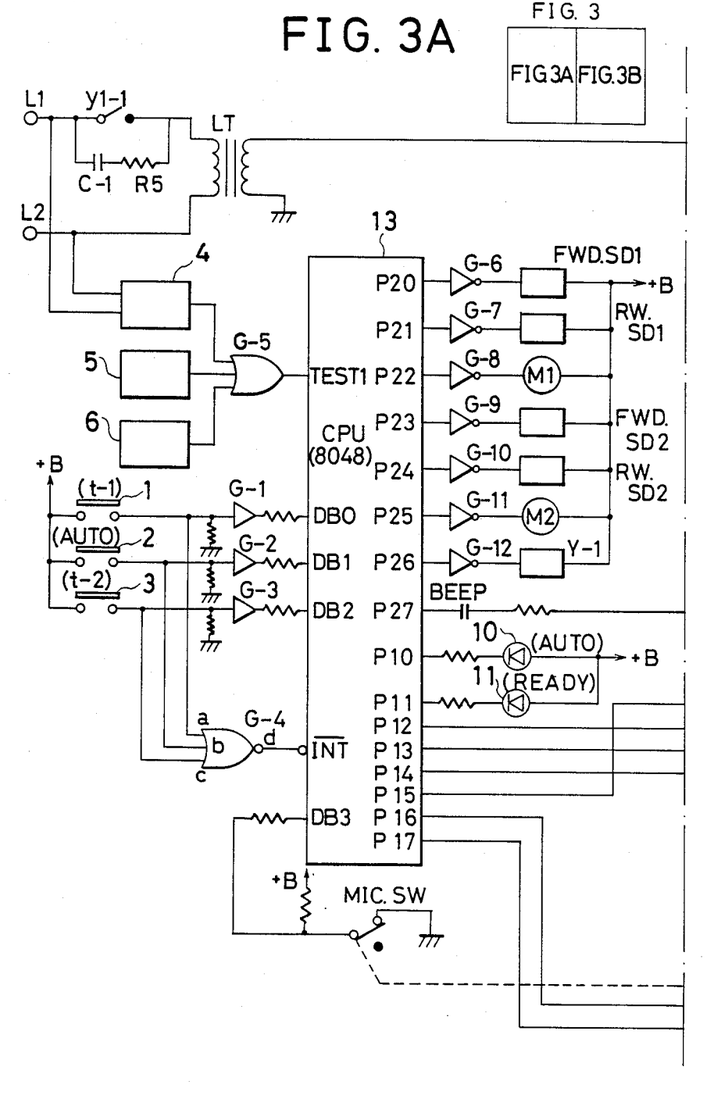
FIGS. 3A and 3B are a circuit diagram showing the main part of the automatic telephone answering-/recording apparatus according to the embodiment of the present invention.
Figure 3B:
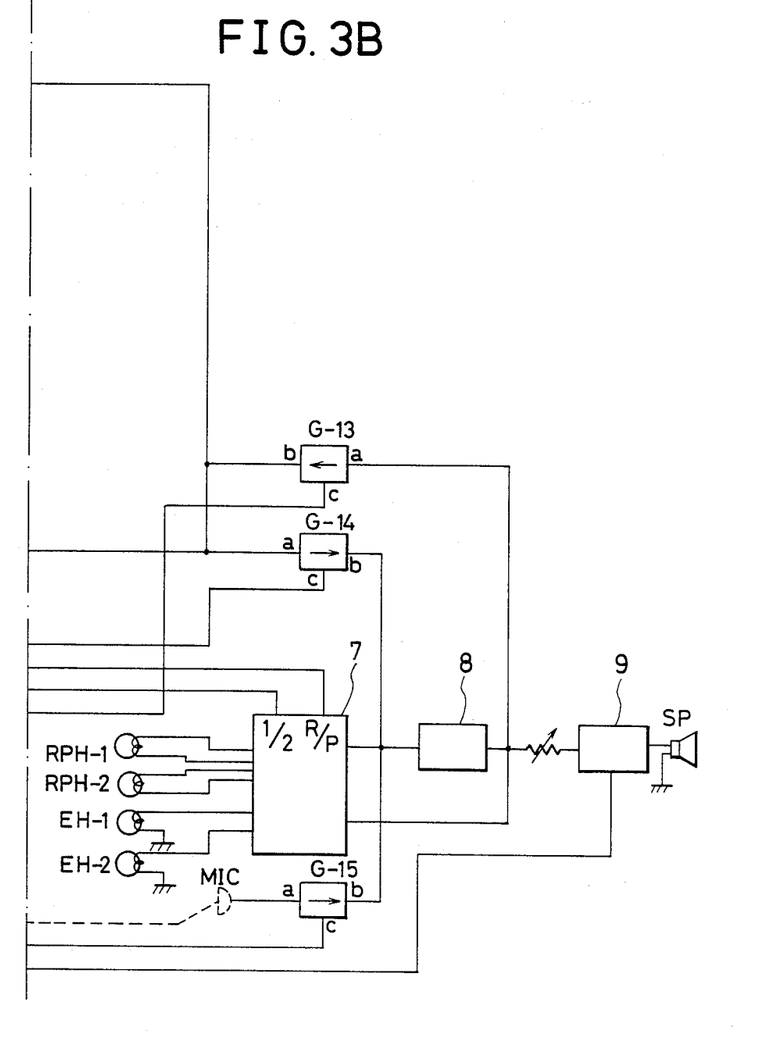

FIG. 2 shows a switch operation panel of the apparatus of the embodiment, and FIG. 3 shows the circuit diagram of the main part thereof.

Referring to FIG. 3, reference numeral 1 denotes an operation button or switch for an outgoing message tape T-1 (not shown); 2, an operation button or switch for setting the apparatus in the automatic answering-/recording mode; and 3, an operation button or switch for an incoming message tape T-2 (not shown). These operation buttons are connected to data bus terminals DB0, DB1 and DB2 of a microprocessor (to be referred to as a CPU hereinafter) 13 through buffers G-1, G-2 and G-3, respectively. In this embodiment, the CPU 13 comprises a CPU 8048. The operation buttons 1, 2 and 3 are also connected to an interrupt terminal INT of the CPU 13 through a 3-input NOR gate G-4. When one or two buttons are depressed (to be described in detail later), an interrupt request is supplied to the interrupt terminal INT, and the CPU 13 detects one or two depressed buttons in response to the key input signals from the corresponding buttons received at the corresponding terminals of the terminals DB0 to DB2 in accordance with a program stored in the CPU 13. Output ports P20 to P26 of the CPU 13 are connected through buffers G-6 to G-12 to a solenoid FWD.SD1 for switching the travel direction of the outgoing message tape T-1 to the forward or normal direction, a motor M1 for driving the outgoing message tape T-1, a solenoid RW.SD1 for switching the travel direction of the outgoing message tape T-1 to the reverse direction, a solenoid FWD.SD2 for switching the travel direction of the incoming message tape T-2 to the forward direction, a solenoid RW.SD2 for switching the travel direction of the incoming message tape T-2 to the reverse direction, a motor M2 for driving the incoming message tape T-2, and an engaging relay Y-1.

A light-emitting diode 10 connected to an output port P10 is turned on when the operation button 2 is depressed. A light-emitting diode 11 connected to an output port P11 is turned on when the outgoing message tape T-1 is set at the start position of the outgoing message after the operation button 2 is depressed, thereby indicating that the automatic telephone answering-/recording apparatus is set in the standby mode.

Although omitted in FIG. 3, light-emitting diodes for indicating the operating states (i.e., the REC, PLAY, REW and FF modes) of the outgoing message tape T-1 and the incoming message tape T-2 are connected to the data bus terminals DB0 to DB7 (partially omitted). Reference symbols RPH-1 and EH-1 denote a REC/-PLAY head and an ERASE head for the outgoing message tape T-1, respectively; RPH-2 and EH-2, a REC/PAY head and an ERASE head for the incoming message tape T-2, respectively. The REC/PLAY heads RPH-1 and RPH-2 and the ERASE heads EH-1 and EH-2 are connected to a switching circuit 7. The switching circuit 7 includes an analog circuit and a relay. When a terminal ½ of the switching circuit 7 is set at H level (logic "1"), the heads for the outgoing message tape T-1 are selected. However, when the terminal ½ is set at L level (logic "0"), the heads for the incoming message tape T-2 are selected. In addition, when a terminal R/P is set at H level, the REC/PLAY head RPH-1 or RPH-2 selected in accordance with the logic state of the terminal ½ is set in the REC mode. However, when the terminal R/P is set at L level, the corresponding head is set in the PLAY mode. Reference numeral 8 denotes a preamplifier; and 9, a main amplifier. Reference symbol SP denotes a loudspeaker. Reference symbols G-13, G-14 and G-15 denote analog switches, respectively. In each of the analog switches G-13, G-14 and G-15, when a control terminal c is set at H level, terminals a and b are rendered conductive. Reference symbol MIC denotes a microphone. When the microphone MIC is pulled out from a microphone plug (not shown), a microphone switch MIC.SW is switched to the lower position of FIG. 1, and the data bus terminal DB3 is set at H level. In this state (to be described in detail later), when the user simultaneously depresses the operation switches 2 and 3, conversation is recorded through telephone lines L1 and L2. However, when the microphone MIC is plugged in, voice from the microphone MIC is recorded. Reference numeral 4 denotes a ringing circuit for detecting an incoming call; 5, a start point detector for detecting a start point of the outgoing message tape T-1; and 6, a start point detector for detecting a start point of the incoming message tape T-2. The ringing circuit 4 and the start point detectors 5 and 6 are connected to a terminal TEST1 of the CPU 13 through a 3-input OR gate G-5.

Figure 4A:
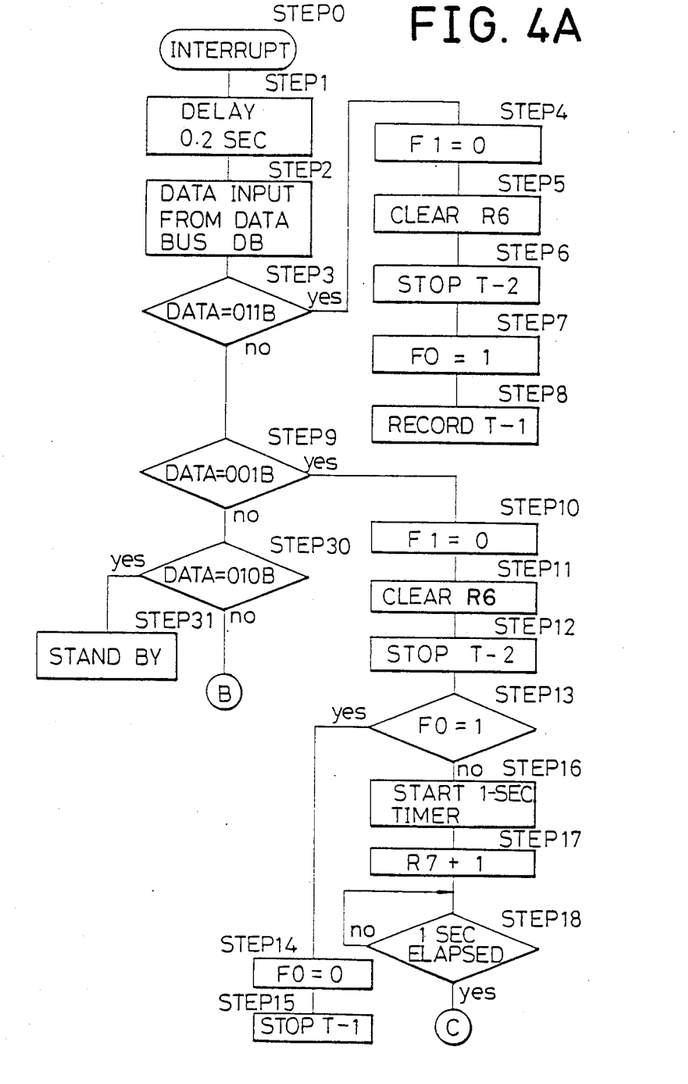
FIGS. 4A, 4B, 5A and 5B are flow charts for explaining the operation of the apparatus shown in FIGS. 3A and 3B.
Figure 4B:
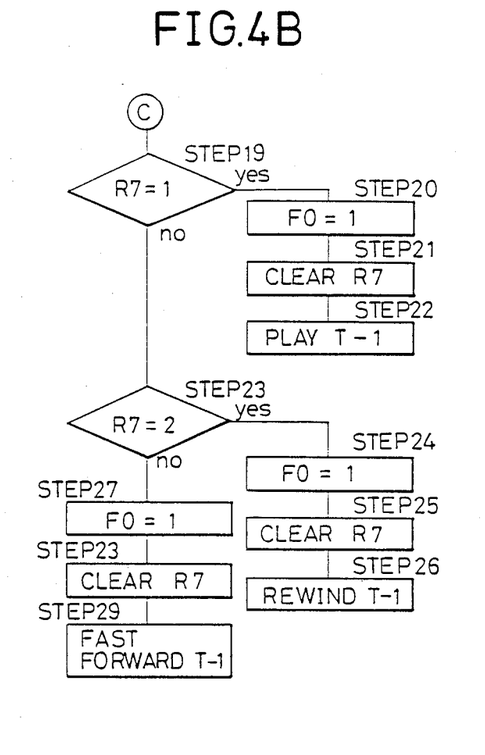

The automatic telephone answering/recording apparatus has the arrangement as described above, and the operation thereof will be described with reference to flow charts of FIGS. 4 and 5.

When the user simultaneously depresses the operation switches 1 and 2 so as to record an outgoing message on the outgoing message tape T-1 (not shown) having two ends, terminals a and b of the OR gate G-4 go to H level, and an output terminal d thereof goes to L level, as is apparent from FIG. 3 An interrupt request is supplied to the interrupt terminal INT of the CPU 13. The flow of the program in the CPU 13 advances from step 0 to step 1 (FIG. 4), thereby providing a delay time of 0.2 seconds. This delay time is for compensating a timing delay upon simultaneous depression of the operation switches 1 and 2 by user's fingers and chattering of the contacts. When either of the operation switches is turned off before the timing delay time has elapsed, the recording mode becomes invalid. The CPU 13 receives data from the data bus terminals DB0, DB1 and DB3. The CPU 13 then checks in step 3 whether or not the lower three bits of the received data are set to be "011". Since the operation switches 1 and 2 are simultaneously depressed, the terminals DB2, DB1 and DB0 are set to be logic "0", logic "1" and logic "1". The flow thus advances to step 4, and a flag F1 (to be described later) is cleared to logic "0". A register R6 (to be described later) is cleared in step 5. In addition, when the incoming message tape T-2 is travelling, it is stopped in step 6.

Steps 4 to 6 are the sequence for automatically stopping the travel of the incoming message tape T-2 when the outgoing message tape T-1 is to be driven without specifying the stop of the travelling incoming message tape T-2. In step 7, a flag F0 is set at logic "1". This is to control the program flow so as to stop the outgoing message tape T-1 when the operation switch 1 is depressed after the outgoing message is recorded in the outgoing message tape T-1. The outgoing message tape T-1 is driven in the REC mode in step 8. The means for driving the outgoing message tape T-1 in the REC mode is known, and a detailed description is omitted from the flow chart. However, the means described above will be briefly described with reference to FIG. 3. When the output port P20 is set at logic "1" to energize the solenoid FWD.SD1 and the output port P22 is set at logic "1" to drive the motor M, the outgoing message tape T-1 is driven in the forward direction. At the same time, the output port P13 is set at logic "1" so as to energize the heads RPH-1 and EH-1 for the outgoing message tape T-1 through the switch circuit 7, and the output port P12 is set at logic "1" so as to set the head RPH-1 in the REC mode. In addition, the output port P16 is set at logic "1" to turn on the analog switch G-15, so that the microphone MIC is energized. Furthermore, the output port P17 is set at logic "1", so that the main amplifier, 9 is deenergized to prevent feedback howling. In this manner, the output from the microphone MIC is recorded on the outgoing message tape T-1.

In order to stop the outgoing message tape T-1 which is driven in the REC mode, the user depresses the operation switch 1 again, and an interrupt request is supplied to the CPU 13 through the NOR gate G-4. The flow advances from step 0 to step 3, skipping steps 1 and 2. Since only the operation switch 1 is depressed, data from the data bus terminals DB2 to DB0 has the content of "001" differing from "011". The flow advances to step 9. The CPU 13 then checks in step 9 whether or not the data has the content of "001". Since YES in step 9, the flow advances to step 10. Steps 10 to 12 are the same sequence as that in steps 4 to 6. More particularly, the incoming message tape T-2 is automatically stopped when the operation button 1 is depressed while the incoming message tape T-2 is driven. The CPU 13 then checks in step 13 whether or not the flag F0 is set at logic "1". Since the flag F0 is already set at logic "1" in step 7, the flow advances from step 13 to step 14. The flag F0 is reset to logic "0" in step 14. This process is required as a means for starting the outgoing message tape T-1 when the operation button 1 is depressed. The outgoing message tape T-1 is then stopped in step 15.

In order to play the outgoing message tape T-1 after outgoing message recording is finished, the outgoing message tape T-1 must be rewound. The REW operation will be described. In order to rewind the outgoing message tape T-1, the user depresses the operation switch 1 twice. When the user depresses the operation switch 1 once, the flow advances to step 13 through steps 0, 1, 3, 9, 10, 11 and 12. Since the flag F0 has been cleared in step 14, the program flows to step 16. A one-second timer is started in step 16. A register (i.e., register R7) in the CPU 13 is incremented by one in step 17. The register R7 is cleared to be "00" during the initialization routine upon energization of the automatic telephone answering/recording apparatus. Therefore, the register R7 is set to be 1 (decimal notation) in step 17. The CPU 13 then checks in step 18 whether or not one second has elapsed. When the user depresses the operation button 1 again within one second, another interrupt request is supplied to the CPU 13 and the program flows from step 0 to step 18 through the intermediate steps. In step 17, the register R7 is incremented by one again and has a count of 2 (decimal notation). When the CPU 13 detects in step 18 that one second has elapsed, the flow advances from step 19 to step 23. The CPU 13 checks in step 23 whether or not the count of the register R7 is set to be 2. Since YES in step 23, the flow advances to step 24. The flag F0 is set at logic "1" in step 24. This operation is performed to stop the outgoing message tape T-1 to be described later. The CPU 13 clears the register R7 in step 25. This clear operation is performed for the same reason as in step 5. In step 26, the outgoing message tape T-1 is rewound. This rewinding operation is known to a person skilled in the art, and an illustration thereof is omitted from the flow chart. However, in practice, the outgoing message tape T-1 is rewound to its start point. When the start point is detected by the corresponding start point detector and the terminal TEST1 of the CPU 13 in accordance with the program, the outgoing message tape T-1 is automatically stopped. It should be noted that the REW mode can be cancelled when the operation switch 1 is depressed once.

In order to play the recorded message from the outgoing message tape T-1 rewound to its start point so as to check the recorded message, the user depresses the operation switch 1 once. An interrupt request is supplied to the CPU 13, so that the flow advances to step 19 through steps 0, 1, 2, 3, 9, 10, 11, 12, 13, 16, 17 and 18. In this case, the count of the register R7 is set to be 1 (decimal) since the operation button 1 is depressed once. The flow advances to step 20 wherein the flag F0 is set at logic "1". The register R7 is cleared at step 21. The outgoing message tape T-1 is played in step 22.

In order to fast-forward the outgoing message tape T-1, this tape is stopped in the manner described above, and the user depresses the operation switch 1 three times. As is apparent from the previous description, since the count of the register R7 is set to be 3 (decimal), the flow advances from step 23 to step 29 through steps 27 and 28. In step 29, the outgoing message tape T-1 is fast-forwarded.

The operation of the incoming message tape T-2 will be described. The same description as in the outgoing message tape T-1 will be simplified or omitted by way of simplicity. In order to drive the incoming message tape T-2 in the REC mode, the user simultaneously depresses the operation switch (AUTO) 2 and the operation switch 3. The data bus terminals DB2, DB1 and DB0 are set at logic "1", logic "1" and logic "0", respectively. The data "110" is fetched by the CPU 13, so that the flow advances to step 32 of FIG. 5 through steps 0, 1, 2, 3, 9 and 30. The flag F0 is cleared in step 32. The CPU 13 then clears the register R7 in step 33 and stops the outgoing message tape T-1 in step 34. Steps 32, 33 and 34 are the same sequence as in steps 4, 5 and 6 so as to prevent malfunction when the incoming message tape T-2 is operated while the outgoing message tape T-1 is driven. The CPU 13 checks in step 35 whether or not the data from the data bus terminals DB2 to DB0 is set to be "110". Since YES in step 35, the flag F1 is set at logic "1" in step 36. This operation provides the same effect as in the case of the flag F0. The CPU 13 then checks in step 37 whether the data bus terminal DB3 is set at H level (logic "1") or L level (logic "0"). When the microphone MIC is plugged in, and the switch MIC.SW interlocked with the microphone MIC is set in the position shown in FIG. 1, the flow advances to step 38. In step 38, the message entered at the microphone MIC is recorded on the incoming message tape T-2. However, when the microphone MIC is pulled out, the flow advances to step 39, thereby recording the message of the calling party through the telephone lines when the analog switch G-14 is turned on.

When the user wishes to play the incoming message tape T-2, he depresses the operation button 3 once. When the user wishes to rewind the incoming message tape T-2, he depresses the operation button 3 twice. When the user wishes to fast-forward the incoming message tape T-2, he depresses the operation button 3 three times. The flow chart of the above operations is illustrated in FIG. 5 and is substantially the same as that of the outgoing message tape T-1, except that the flags F1 and the register R6 are used in place of the flag F0 and the register R7.

In order to set the apparatus in the automatic answering/recording mode, the user depresses the operation switch (AUTO) 2. The flow advances to step 30 through steps 0, 1, 2, 3, and 9. Since the data from the operation buttons coincides with data "010", the flow advances to step 31, and the apparatus is set in the standby mode in accordance with the program. In this standby mode, the light-emitting diode 10 is turned on, the start position of the outgoing message tape is detected, and the outgoing message tape T-1 is stopped. The end of this detection operation turns on the light-emitting diode 11 and activates the terminal TEST1 of the CPU 13, thereby awaiting reception of the ringing.

In order to set the apparatus in the standby mode, the user depresses only the operation button 2. This is because the CPU 13 is reset upon energization of the apparatus, and the program is started from address 000 and jumps to step 31, thereby setting the apparatus in the standby mode. It should be noted that when detection of the start position of the outgoing message tape T-1 is not finished, a prescribed program is executed to complete the detection operation and the apparatus is then set in the standby mode.

Figure 5A:
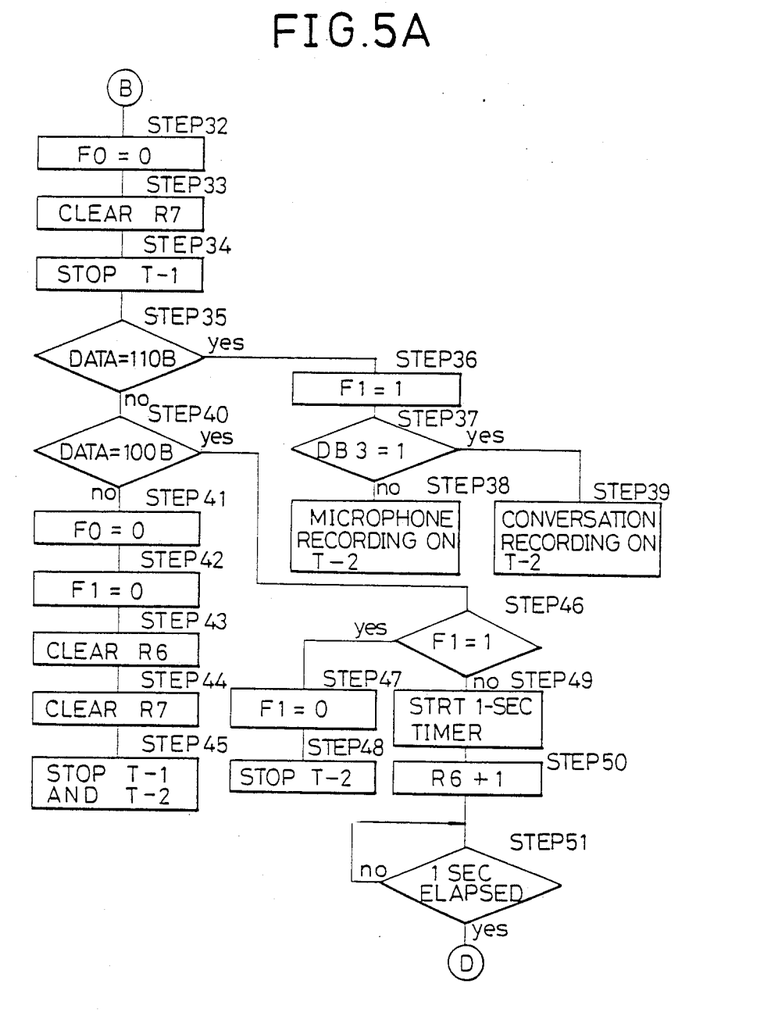
Figure 5B:
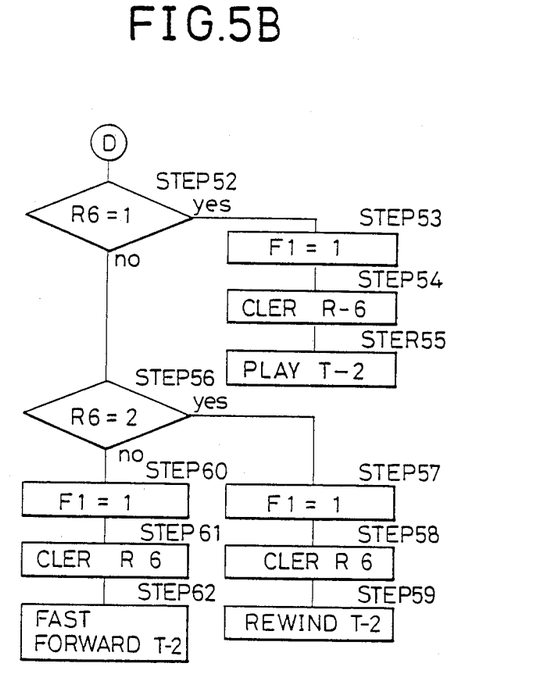

Steps 41 to 45 of FIG. 5 are a sequence for clearing the flags F0 and F1 and the registers R6 and R7 so as to prevent malfunction when the operation buttons 1 and 2 or buttons 1, 2 and 3 are simultaneously depressed, thereby stopping the outgoing message tape T-1 and the incoming message tape T-2.

In the above embodiment, the tape having two ends is used as the outgoing message tape T-1. However, when an endless tape is used as the outgoing message tape T-1, the REW and FF operations need not be performed. In this case, steps 24 to 29 are omitted. Similarly, when the outgoing and incoming message storage means comprise speech synthesizing means using a solid-state circuit such as a RAM, the REW and FF operations need not be performed. The operation steps may be executed while the user watches the tape. However, when light-emitting diodes are used to indicate the operation state in each step, a more precise operating means can be provided.

In the above embodiment, the record switch is used also as the operation switch (AUTO) 2 for automatic outgoing message recording. However, a special record button can be added in addition to the operation switch 2. In this case, the special button must be arranged in position inaccessible to others and children or provided within a special cover. More particularly, the special switch button is connected to a data bus DB 4 shown in FIG. 3 (data bus terminals DB0 to DB7 assigned to a CPU8048 as a microprocessor 13 are not shown), when the operation button 1 and the special record button are simultaneously depressed, and the terminals DB0 and DB4 of the microprocessor 13 are simultaneously set at logic "1", the operation after step 4 in the flow chart portion for incoming message tape recording in FIG. 4 is performed. When the operation button 3 for the incoming message tape T-2 and the special record button are simultaneously depressed, the terminals DB2 and DB4 of the microprocessor 13 are simultaneously set at logic "1", so that the operation after step 36 in the flow chart portion for incoming message tape recording in FIG. 5 will be performed. When only the operation switch 2 is depressed and the terminal DB1 of the microprocessor 13 is set at logic "1", the operation after step 31 in the flow chart portion for automtatic waiting in FIG. 4 is performed in the same manner as in waiting mode operation as previously described.

What is claimed is:

1. An easily operable telephone answering apparatus of a double cassette type, comprising:
   a first operation button for operation of an outgoing message media;
   a second operation button for operation of an incoming message media;
   a third operation button for auto operation from said outgoing message media to said incoming message media;
   driving means for driving each of said outgoing message media and said incoming message media in a plurality of modes, including recording, playing back, rewinding and fast-forwarding modes;
   detecting means for detecting depressions of the buttons and counting a number of times of depression of each button; and
   controlling means responsive to each detecting means for controlling said driving means so that each of said outgoing message media and said incoming message media is operated by said driving means in a mode corresponding to the particular buttons depressed and the number of times each particular button is depressed as determined by the detecting means;
   wherein said auto operation from said outgoing message media to said incoming message media is performed when said auto operation button is depressed, thereby automatically positioning said outgoing message media to the beginning of an outgoing message prerecorded on said outgoing message media, and in response to an incoming telephone call, recording an incoming message from telephone lines on the incoming message media.

2. An apparatus according to claim 1, wherein said outgoing message media is driven in playing back, rewinding and fast-forwarding modes when said first operation button is depressed once, twice and three times, respectively, and said incoming message media is driven in playing back, rewinding and fast-forwarding modes when said second operation button is depressed once, twice and three times, respectively.

3. An apparatus according to claim 1, wherein said outgoing message tape is driven in a recording mode upon depression of said first and second operation buttons, and said incoming message tape is driven in a recording mode upon depression of said second and third operation buttons.

* * * * *